(12) United States Patent
Aisthorpe-Buckley

(10) Patent No.: US 11,212,339 B2
(45) Date of Patent: Dec. 28, 2021

(54) METHOD AND APPARATUS FOR DATA QUALITY FRAMEWORK MODULE

(71) Applicant: JPMorgan Chase Bank, N.A., New York, NY (US)

(72) Inventor: Timothy James Aisthorpe-Buckley, Hampshire (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 170 days.

(21) Appl. No.: 16/276,032

(22) Filed: Feb. 14, 2019

(65) Prior Publication Data

US 2020/0267206 A1 Aug. 20, 2020

(51) Int. Cl.
*H04L 29/08* (2006.01)

(52) U.S. Cl.
CPC .............. *H04L 67/10* (2013.01); *H04L 67/02* (2013.01)

(58) Field of Classification Search
CPC . H04L 41/0816; H04L 43/0882; H04L 45/64; H04L 41/5003; H04L 41/0893
See application file for complete search history.

(56) References Cited

U.S. PATENT DOCUMENTS

| | | | |
|---|---|---|---|
| 10,701,009 B1* | 6/2020 | Li | H04L 51/16 |
| 2008/0059597 A1* | 3/2008 | Blevins | G06F 9/542 |
| | | | 709/207 |
| 2010/0005346 A1* | 1/2010 | Hamlescher | G06Q 10/06 |
| | | | 714/57 |
| 2015/0169651 A1* | 6/2015 | Michael | H04L 67/02 |
| | | | 707/792 |
| 2017/0032015 A1* | 2/2017 | Shkapenyuk | G06F 16/283 |

* cited by examiner

*Primary Examiner* — Kevin T Bates
*Assistant Examiner* — Emad Siddiqi
(74) *Attorney, Agent, or Firm* — Greenblum & Bernstein, P.L.C.

(57) ABSTRACT

Various methods, apparatuses, and media for implementing a data quality framework (DQ rules) module are provided. A processor is configured to model data quality rules using a natural rule language (NRL) as constraints on a plurality of communication models. The processor generates protocol buffer definitions from the plurality of communication models to create a protocol buffer class. The protocol buffer class is utilized to create a message by a publication application. The message is to be transmitted over a publish-subscribe messaging bus to a server. The processor embeds the data quality rules within the protocol buffer class and determines a quality of the message by evaluating the data quality rules against the message.

17 Claims, 7 Drawing Sheets

METHOD AND APPARATUS FOR DATA QUALITY FRAMEWORK MODULE

TECHNICAL FIELD

This disclosure generally relates to a data quality framework module, and, more particularly, to methods and apparatuses for implementing a data quality framework module for protocol buffer messaging over a publish-subscribe messaging bus in a networked environment.

BACKGROUND

In a typical publish-subscribe (pub-sub) environment, many applications (e.g., web applications) may publish many messages for consumption/reception/acceptance by a multitude of other applications. A web application is a software application that is accessible via a web browser. For example, a web application may be a document, such as a hypertext markup language (HTML) document. A document web application may be configured to present information available over a network visually to a user. A document web application may present to a user of a client device (e.g., a computing device/processor operating at client side) one or more links (e.g., to a URI) to available information.

According to conventional technology, data models may be created to define communication contracts and may generate protocol buffer classes directly from those contracts. Applications may use those protocol buffer classes to construct messages that they may then publish on to a messaging bus. By the time a subscribing application has received the message and realized that there may be a data quality problem, several other applications may have already consumed and acted on that same message. If the message needs to be corrected, all of the other systems that may have successfully processed the message may also need to reprocess the updated message. Thus, there is a problem with this conventional approach is that when publishers publish low quality data, it may impact several downstream systems.

SUMMARY

The present disclosure, through one or more of its various aspects, embodiments, and/or specific features or sub-components, provides, inter alia, various systems, servers, devices, methods, media, programs, and platforms for a data quality framework module for protocol buffer messaging over a pub-sub messaging bus in a networked environment to improve network communications between a client device and a server device as well as to reduce impacts of low quality data on downstream systems. The various aspects, embodiments, features, and/or sub-components provide optimized processes of implementing a data quality framework module in which a low quality data may be detected earlier within a publishing application (e.g., a publishing application in a client device) and may be prevented from being published onto a server device prior to downloading the low quality data by one or more subscriber applications (e.g., subscriber applications in server devices), thereby reducing impacts of low quality data on downstream systems and improving network communications between a client device and a server device.

According to an aspect of the present disclosure, a method for implementing a data quality framework module is disclosed. The method may include: modeling, by a processor, data quality rules using a natural rule language (NRL) as constraints on a plurality of communication models; generating, by the processor, protocol buffer definitions from the plurality of communication models to create a protocol buffer class, wherein the protocol buffer class is utilized to create a message by a publication application, the message to be transmitted over a publish-subscribe messaging bus to a server; embedding, by the processor, the data quality rules within the protocol buffer class; and determining, by the processor, a quality of the message by evaluating the data quality rules against the message.

According to another aspect of the present disclosure, the method may further include: setting, by the processor, a predetermined threshold level of data quality required by the server for publishing the message to be transmitted over the publish-subscribe messaging bus to the server; and rejecting, by the processor, publication of the message, when in the determining, it is determined by the processor that the quality of the message is below the predetermined threshold level.

According to yet another aspect of the present disclosure, the method may further include: setting, by the processor, a predetermined threshold level of data quality required by the server for publishing the message to be transmitted over the publish-subscribe messaging bus to the server; and accepting, by the processor, publication of the message, when in the determining, it is determined by the processor that the quality of the message is at or above the predetermined threshold level.

According to an aspect of the present disclosure, the plurality of communication models may include one or more unified modeling language (UML) models and the generating may further generating, by the processor, the protocol buffer definitions from the UML models based on the data quality rules.

According to another aspect of the present disclosure, the method may further include: parsing, by the processor, the NRL; and creating, by the processor, a JavaScript Object Notation (JSON) representation of the data quality rules.

According to a further aspect of the present disclosure, the method may further include embedding, by the processor, the JSON representation of the data quality rules to the protocol buffer class as Java annotations.

According to yet another aspect of the present disclosure, the method may further include: setting, by the processor, a predetermined threshold level of data quality required by the server for accepting a published message published by a publisher application and to be accepted by a subscriber application; and rejecting, by the processor, acceptance of the published message by the subscriber application, when in the determining, it is determined by the processor that the quality of the message is below the predetermined threshold level.

According to yet another aspect of the present disclosure, the method may further include: setting, by the processor, a predetermined threshold level of data quality required by the server for accepting a published message published by a publisher application and to be accepted by a subscriber application; and allowing, by the processor, acceptance of the published message by the subscriber application, when in the determining, it is determined by the processor that the quality of the message is at or above the predetermined threshold level.

According to a further aspect of the present disclosure, a system for implementing a data quality framework module is disclosed. The system may include a processor and a server connected via one or more communication networks.

The processor may be configured to: model data quality rules using a natural rule language (NRL) as constraints on a plurality of communication models; generate protocol buffer definitions from the plurality of communication models to create a protocol buffer class, wherein the protocol buffer class is utilized to create a message by a publication application, the message to be transmitted over a publish-subscribe messaging bus to the server; embed the data quality rules within the protocol buffer class; and determine a quality of the message by evaluating the data quality rules against the message.

According to yet another aspect of the present disclosure, the processor may be further configured to: set a predetermined threshold level of data quality required by the server for publishing the message to be transmitted over the publish-subscribe messaging bus to the server; and reject publication of the message based on a determination that the quality of the message is below the predetermined threshold level.

According to other aspect of the present disclosure, the processor may be further configured to: set a predetermined threshold level of data quality required by the server for publishing the message to be transmitted over the publish-subscribe messaging bus to the server; and accept publication of the message based on a determination that the quality of the message is at or above the predetermined threshold level.

According to yet another aspect of the present disclosure, the plurality of communication models include one or more unified modeling language (UML) models and the processor is further configured to generate the protocol buffer definitions from the UML models based on the data quality rules.

According to an aspect of the present disclosure, the processor may be further configured to: parse the NRL; and create a JavaScript Object Notation (JSON) representation of the data quality rules.

According to yet another aspect of the present disclosure, the processor may be further configured to: embed the JSON representation of the data quality rules to the protocol buffer class as Java annotations.

According to another aspect of the present disclosure, the processor may be further configured to: set a predetermined threshold level of data quality required by the server for accepting a published message published by a publisher application and to be accepted by a subscriber application; and reject acceptance of the published message by the subscriber application based on a determination that the quality of the message is below the predetermined threshold level.

According to yet another aspect of the present disclosure, the processor may be further configured to: set a predetermined threshold level of data quality required by the server for accepting a published message published by a publisher application and to be accepted by a subscriber application; and allow acceptance of the published message by the subscriber application based on a determination that the quality of the message is at or above the predetermined threshold level.

According to an aspect of the present disclosure, a non-transitory computer readable medium is disclosed. The non-transitory computer readable medium may be configured to store instructions for implementing a data quality framework module, wherein when executed, the instructions cause a processor to perform the following: modeling data quality rules using a natural rule language (NRL) as constraints on a plurality of communication models; generating protocol buffer definitions from the plurality of communication models to create a protocol buffer class, wherein the protocol buffer class is utilized to create a message by a publication application, the message to be transmitted over a publish-subscribe messaging bus to a server; embedding the data quality rules within the protocol buffer class; and determining a quality of the message by evaluating the data quality rules against the message.

According to another aspect of the present disclosure, the instructions may further cause the processor to perform the following: setting a predetermined threshold level of data quality required by the server for publishing the message to be transmitted over the publish-subscribe messaging bus to the server; and rejecting publication of the message based on a determination that the quality of the message is below the predetermined threshold level.

According to yet another aspect of the present disclosure, the instructions may further cause the processor to perform the following: setting a predetermined threshold level of data quality required by the server for publishing the message to be transmitted over the publish-subscribe messaging bus to the server; and accepting publication of the message based on a determination that the quality of the message is at or above the predetermined threshold level.

According to another aspect of the present disclosure, the plurality of communication models include one or more unified modeling language (UML) models and the instructions, when executed, further cause the processor to perform the following: generating the protocol buffer definitions from the UML models based on the data quality rules.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
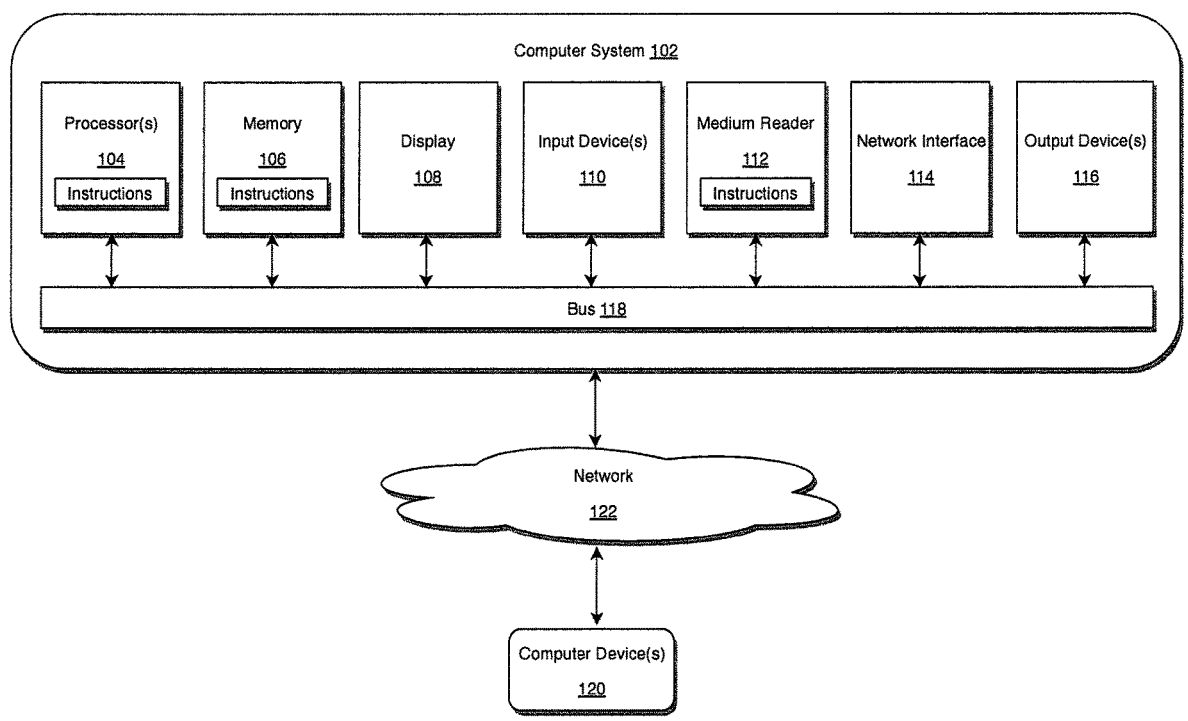
FIG. 1 illustrates a computer system for implementing a data quality framework module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a data quality (DQ) framework module to reduce impacts of low quality data on downstream systems, thereby improving network communications between a client device and a server device.

Figure 2:
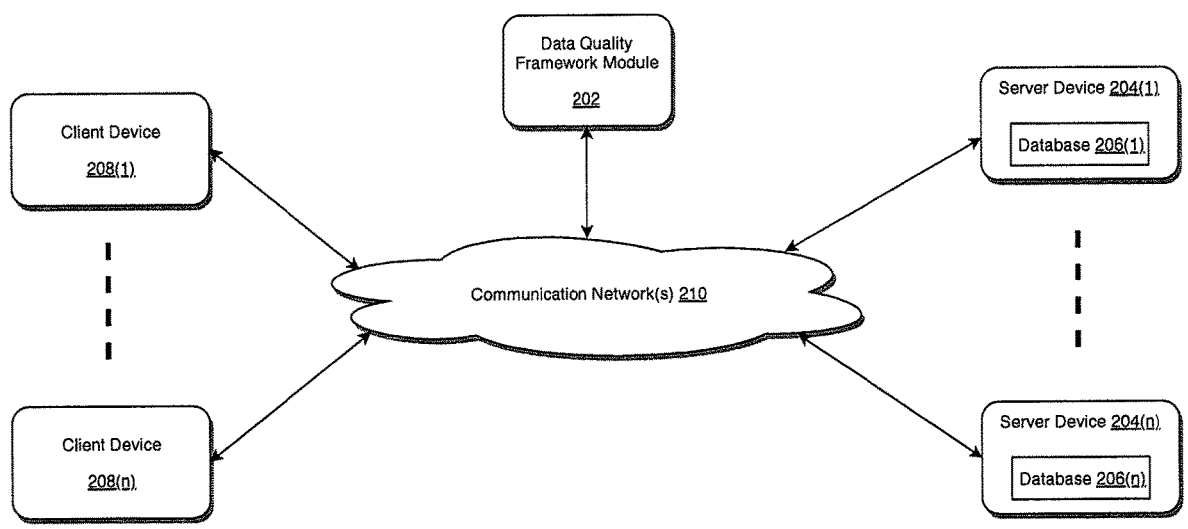
FIG. 2 illustrates an exemplary diagram of a network environment with a data quality framework module in accordance with an exemplary embodiment.

Referring to FIG. 2, a schematic of an exemplary network environment 200 for implementing a DQ framework module (DQFM) of the instant disclosure is illustrated.

According to conventional pub-sub environment, that does not implement a DQFM of the instant disclosure, data models may be created to define communication contracts and may generate protocol buffer classes directly from those contracts and applications may use those protocol buffer classes to construct messages that they may then publish on to a messaging bus. However, according to conventional pub-sub environment, by the time a subscribing application has received the message and realized that there may be a data quality problem, several other applications may have already consumed and acted on that same message. Thus, according to conventional pub-sub environment, if the message needs to be corrected, all of the other systems that may have successfully processed the message may also need to reprocess the updated message. Thus, there is a problem with this conventional approach is that when publishers publish low quality data, it may impact several downstream systems and may slow down communication speeds between a client device and a server device.

According to exemplary embodiments, the above-described problems associated with conventional approach of publishing a message in a pub-sub environment may be overcome by implementing DQFM 202 as illustrated in FIG. 2. The DQFM 202 may be the same or similar to the computer system 102 as described with respect to FIG. 1. The DQFM 202 may store one or more applications that can include executable instructions that, when executed by the DQFM 202, cause the DQFM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DQFM 202 itself, may be located in virtual server(s) running in a cloud-based computing environment rather than being tied to one or more specific physical network computing devices. Also, the application(s) may be running in one or more virtual machines (VMs) executing on the DQFM 202. Additionally, in one or more embodiments of this technology, virtual machine(s) running on the DQFM 202 may be managed or supervised by a hypervisor.

In the network environment 200 of FIG. 2, the DQFM 202 is coupled to a plurality of server devices 204(1)-204(n) that hosts a plurality of databases 206(1)-206(n), and also to a plurality of client devices 208(1)-208(n) via communication network(s) 210. A communication interface of the DQFM 202, such as the network interface 114 of the computer system 102 of FIG. 1, operatively couples and communicates between the DQFM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DQFM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DQFMs that efficiently combine multiple client side to server connections from the same browser into a single connection per browser to improve network communication and reduce power consumption.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DQFM 202 may be a standalone device or integrated with one or more other devices or apparatuses, such as one or more of the server devices 204(1)-204(n), for example. In one particular example, the DQFM 202 may include or be hosted by one of the server devices 204(1)-204(n), and other arrangements are also possible. Moreover, one or more of the devices of the DQFM 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DQFM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DQFM 202 that may efficiently reduce impacts of low quality data on downstream systems in a sub-pub environment and improve network communications between a client device and a server device. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the DQFM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DQFM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DQFM 202, the server devices 204(1)-204(n), or the client devices 208(1)-208(n), for example, may be configured to operate as virtual instances on the same physical machine. For example, one or more of the DQFM 202, the server devices 204(1)-204(n), or the client devices 208(1)-208(n) may operate on the same physical device rather than as separate devices communicating through communication network(s) 210. Additionally, there may be more or fewer DQFMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
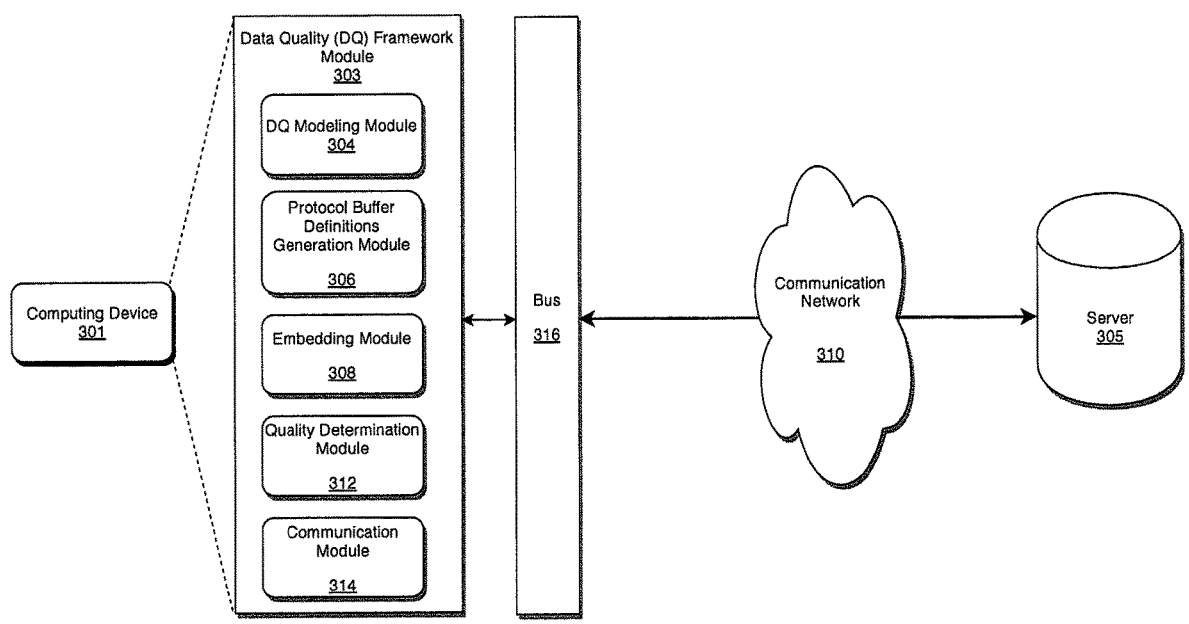
FIG. 3 illustrates a system diagram for implementing a data quality framework module for a protocol buffer messaging in accordance with an exemplary embodiment.

FIG. 3 illustrates a system diagram for implementing a data quality framework module for a protocol buffer messaging in accordance with an exemplary embodiment.

As illustrated in FIG. 3, a computing device 301 may be coupled to a server 305 via a communication network 310 and bus (e.g., a messaging bus) 316 in a pub-sub environment. In order for a publication application to publish a message that may be stored onto the bus 316 or to the server 305 over the bus 316, one or more browser applications (browsers) (not shown) may run on the computing device 301. The communication network 310 may be the communication network 210 as disclosed herein with reference to FIG. 2. Unlike the conventional pub-sub environment, the computing device 301 of the instant disclosure may be configured to implement a DQFM 303 that may efficiently reduce impacts of low quality data on downstream systems, thereby improving network communications between a client device (e.g., computing device 301) and a server device (e.g., server 305).

The computing device 301 may be the same or similar to any one of the client devices 208(1)-208(n) as described with respect to FIG. 2, including any features or combination of features described with respect thereto. The DQFM 303 may be the same or similar to the DQFM 202 as described with respect to FIG. 2, including any features or combination of features described with respect thereto.

According to exemplary embodiments, the DQFM 303 may include a DQ modeling module 304, a protocol buffer definitions generation module 306, an embedding module 308, quality determination module 312, and a communication module 314. As illustrated in FIG. 3, the DQ modeling module 304 may model data quality rules using natural rules language (NRL) as constraints on a plurality of communication models and generate DQ rules. The plurality of communication models may include, for example, one or more uniform modeling language (UML) models.

According to exemplary embodiments, the protocol buffer definitions generating module 306 may generate protocol buffer definitions from the plurality of communication models to create a protocol buffer class. The protocol buffer class may be utilized by a publisher application to create a message that is to be transmitted over the bus 316 to the server 305 by utilizing the communication module 314. One or more subscriber applications in the server side may accept or deny the message transmitted over the bus 316. According to exemplary embodiments, the bus 316 may be a publish-subscribe (pub-sub) messaging bus that allows a publisher application to publish a message and a subscriber application to accept or download or integrate or deny the published message by implementing the DQFM 303.

According to exemplary embodiments, the embedding module 308 may embed the data quality rules within the protocol buffer class created by the protocol buffer definitions generation module 306 and the quality determination module 312 may determine a quality of the message before it is published by the publication application by evaluating the data quality rules against the message. According to the quality determination module 312 may also determine a quality of the message after it is published by the publication application by evaluating the data quality rules against the message.

According to exemplary embodiments, protocol buffers may be a language-neutral, platform-neutral, extensible mechanism to serialize structured data for use in communications protocols. For example, the protocol buffer definitions may be generated by the protocol buffer definitions generation module 306 from the communication models using generation framework (e.g., DQ rules/DQ framework) in accordance with exemplary embodiments as illustrated FIGS. 4 and 5. The same generation framework may also parse the NRL and constructs a JavaScript object notation (JSON) representation of the DQ rules. After the protocol buffer java source has been generated from the protocol buffer definitions, the DQ JSON may be added to the protocol buffer classes as Java annotations.

According to exemplary embodiments, a DQ framework may be able to use reflection to read any protocol buffer message and use the DQ annotations to test the quality of the message. The DQ framework may be embedded by the embedding module 308 within the SDI-AMPS (Shared Data Interface-AMPS) messaging framework, so that when an publisher application publishes a message, the DQ rules may be evaluated by the quality determination module 312 against the publish message and the message may be rejected if it does not meet a minimum level of DQ required by that server 305 or the messaging bus 316.

According to exemplary embodiments, the DQ rules may also be evaluated by the quality determination module 312 against messages after they have been published by the publisher application. For example, a daily DQ report may be generated by the quality determination module 312 that runs against the SDI-AMPS environment and reports on all DQ failures of all messages. Publisher applications may also run the DQ rules against messages before they are published, such as during a user acceptance testing (UAT) phase. Subscriber applications may also have the option to run the DQ rules against received messages before choosing whether or not to accept them.

Figure 6:
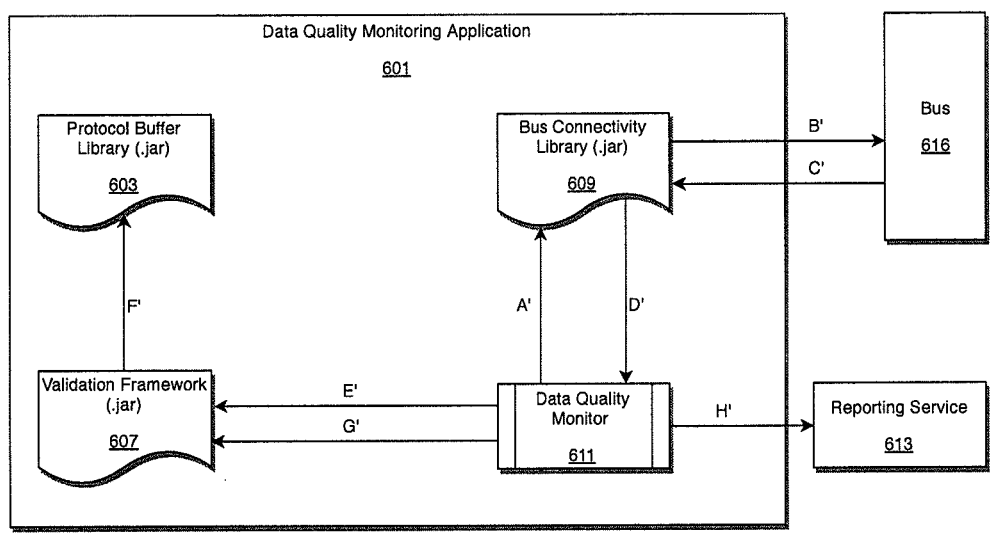
FIG. 6 illustrates a block diagram of a data quality monitoring application in accordance with an exemplary embodiment.

According to an aspect of the instant disclosure, DQ rules may be mastered by the DQ modeling module 304 as constraints on the UML model of the communication model for the message that the DQ rules will be applied to. The constraints may be modelled using NRL, which may allow the rule definitions to be understood by both operations and technology. Protocol buffer definitions may be generated from the UML model by the protocol buffer definitions generation module 306. DQ rules may also be generated by the DQ modeling module 304 from the UML model as JSON documents. For example, an ANTLR (another tool for language recognition) parser may be utilized to read the NRL and generate the JSON document, which may be a configuration that can be used by a validator (e.g., a data quality monitor 611 as illustrated in FIG. 6) in the DQ framework or DQ rules. An exemplary NRL constraint may include: if {capacity name} is not equal to 'Agent' then {owner Party Account} is present.

According to exemplary embodiment, the NRL constraint may be written using "natural language", thereby making it easier to be understood by both Operations and Technical staff. An exemplary resulting JSON for that rule may be illustrated as shown below:

tions and a processor (e.g., one or more programmed microprocessors and associated circuitry) to perform other functions.

Since the pub-sub environment of the instant computing device 301 as illustrated in FIG. 3 may be configured to implement DQFM 403 of the instant disclosure, the pub-sub environment of the instant disclosure may be configured to reduce impacts of low quality data on downstream systems, thereby improving network communications between a client device and a server device. Thus, as compared to conventional pub-sub environment, the various aspects, embodiments, features, and/or sub-components provide optimized processes of implementing a data quality framework module as disclosed above in which a low quality data may be detected earlier within a publishing application (e.g., a publishing application in a client device) and may be prevented from being published onto a server device prior to downloading the low quality data by one or more subscriber applications (e.g., subscriber applications in server devices), thereby reducing impacts of low quality data on downstream systems and improving network communications between a client device and a server device.

Figure 4:
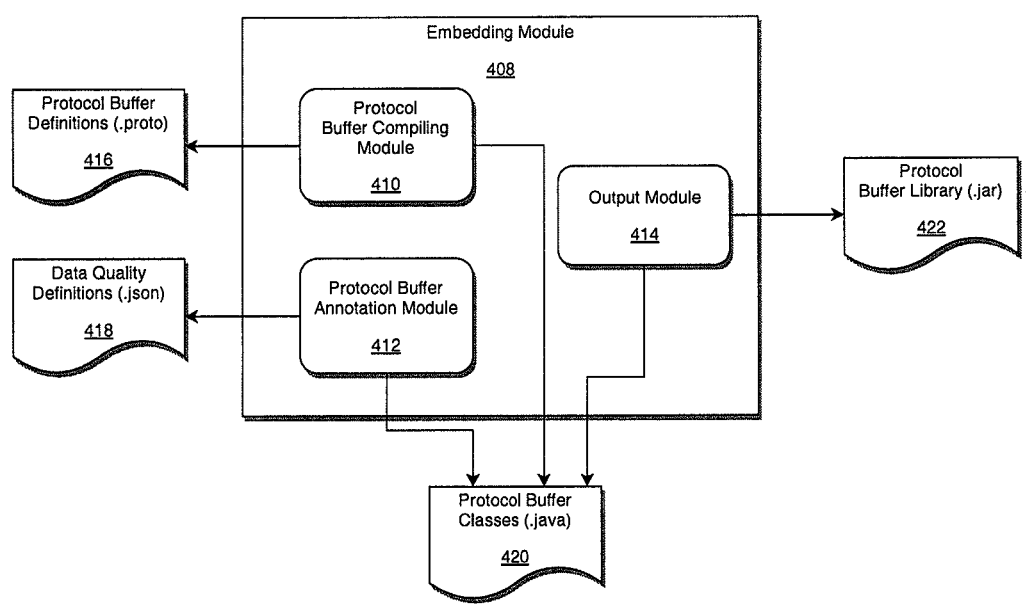
FIG. 4 illustrates a block diagram of an embedding module in accordance with an exemplary embodiment.

FIG. 4 illustrates a block diagram of an embedding module 408 in accordance with an exemplary embodiment. More specifically, FIG. 4 illustrates an exemplary block

```
com.jpmorgan.ib.scpp.sdi.dataobjects.Transaction.SecuritiesTransaction": [
  {
    "ruleName" : "Owner Party Account should be present unless this is an Agency trade",
    "constraintinfo" : {
      "validatorType" : "IF_THEN",
      "positive" : true,
      "children" : [{
         "validatorType" : "IS_ONE_OF",
         "parameters" : {
            "FIELD_PATH" : [ "capacityName" ],
            "LIST_OF_VALUES" : [ "Agent" ]
         },
         "positive" : false,
         "children" : [ ]
      }, {
         "validatorType" : "IS_PRESENT",
         "parameters" : {
            "FIELD_PATH" : [ "ownerPartyAccount" ]
         },
         "positive" : true,
         "children" : [ ]
      }]
    },
    "id" : " _18_5_3 708019d_1529484569377_790819_ 11885",
    "severity" : "FATAL",
    "nrl" : "if {capacity name} is not equal to 'Agent' then {owner Party Account} is present"
  }
]
```

According to exemplary embodiments, each of the DQ modeling module 304, the protocol buffer definitions generation module 306, the embedding module 308, the quality determination module 312, and the communication module 314 of the DQFM 303 may be implemented by microprocessors or similar, and may be programmed using software (e.g., microcode) to perform various functions discussed herein and may optionally be driven by firmware and/or software. Alternatively, each of the DQ modeling module 304, the protocol buffer definitions generation module 306, the embedding module 308, the quality determination module 312, and the communication module 314 of the DQFM 303 may be implemented by dedicated hardware, or as a combination of dedicated hardware to perform some funcdiagram of how to embed DQ rules in protocol buffer classes created by the protocol buffer definitions generation module 306 (see FIG. 3). The embedding module 408, according to exemplary embodiments, may include a protocol buffer compiling module 410, a protocol buffer annotation module 412, and an output module 414. According to exemplary embodiments, each of the protocol buffer compiling module 410, the protocol buffer annotation module 412, and the output module 414 of the embedding module 408 may be implemented by microprocessors or similar, and may be programmed using software (e.g., microcode) to perform various functions discussed herein and may optionally be driven by firmware and/or software. Alternatively, each of the protocol buffer compiling module 410, the protocol buffer annotation module 412, and the output module 414 of the embedding module 408 may be implemented by dedicated hardware, or as a combination of dedicated hardware to perform some functions and a processor (e.g., one or more programmed microprocessors and associated circuitry) to perform other functions.

According to exemplary embodiments, as illustrated in FIG. 4, a protocol buffer definitions (.proto) 416 may be a text file that provides the definitions of one or more protocol buffer (hereinafter, "proto") elements, such as messages, enumerations and extensions, etc. A data quality definitions (.json) file 418, as illustrated in FIG. 4, may be a text file that contains a JSON document of all the DQ definitions that have been defined for the proto messages. According to exemplary embodiments, all of the DQ definitions for messages within a single proto file may be in a single JSON file of the same name. Hereinafter, the protocol buffer definitions (.proto) 416 may simply be referred to as proto file 416, the data quality definitions (.json) 418 may simply be referred to as JSON file 418, and the protocol buffer classes (.java) may simply be referred to as Java source file 420.

The proto file 416 may be read by the protocol buffer compiling module 410 which produces a Java source file 420 for protocol buffer definitions. The protocol buffer compiling module 410, may be, for example, a Google protocol buffer compiler. The protocol buffer annotation module 412 may read the JSON file 418 and insert the relevant parts of the JSON document at appropriate places within the Java source file 420. For example, if the protocol buffer defines 5 messages, there will be 5 classes within the Java source file 420. If the JSON defines DQ constraints for 3 of the messages, 3 of the Java classes will be annotated by the protocol buffer annotation module 412 with the part of the JSON file 418 that is specific to that class.

According to exemplary embodiments, the output module 414 may read the Java source file 420 and may release a protocol buffer library (.jar) 422 file (hereinafter may be referred to as proto library 422).

Figure 5:
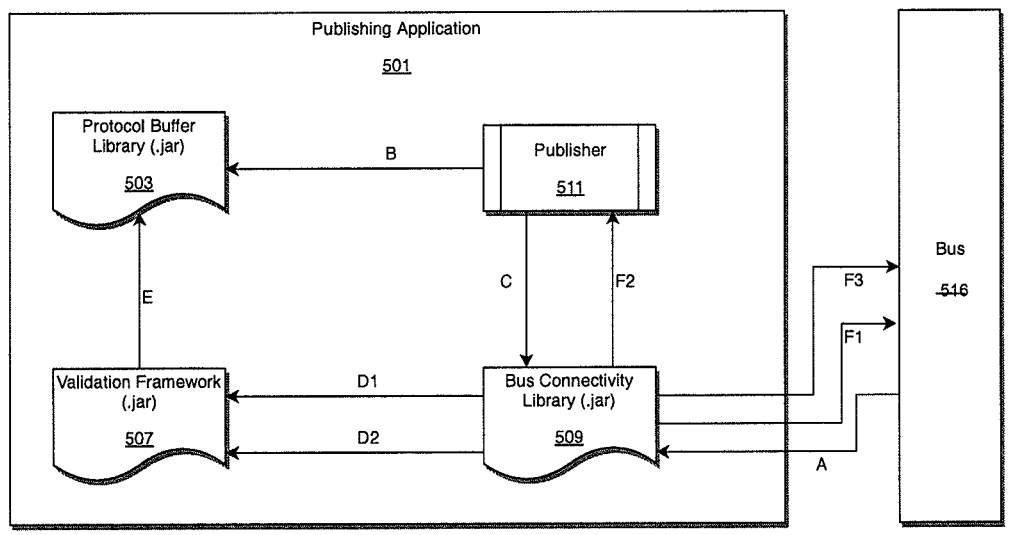
FIG. 5 illustrates a block diagram of a publishing application in accordance with an exemplary embodiment.

According to exemplary embodiments, the annotations inserted into the Java classes contain the actual JSON as text. This JSON may read by the validation framework the first time that it encounters the class within a message that it is validating. The validation framework may parse the JSON and produce a validation configuration object that may be used by a DQ validator (e.g., publisher 511 as illustrated in FIG. 5 or a data quality monitor 611 as illustrated in FIG. 6) to validate the content of the message. The resulting validation configuration object may be cached by the validation framework so that subsequent validations of the same class may not need to be re-parsed the JSON.

According to exemplary embodiments, the DQ validators may use the validation configuration object to determine what validation to apply to which parts of the message. The DQ validators may use protocol buffer reflection to read the message. For example, the validation framework may be used for any message definition, without needing to change the validation code. For example, there may be no hardcoded validation rules or navigation rules within the framework or DQ rules and all of the logic may be contained within the validation configuration that may be embedded within the protocol buffer classes within the Java source file 420. For example, a new protocol buffer definition may be released and validated without updating the validation framework code (only the new proto library 422 may needed to be deployed). According to exemplary embodiments, with protocol buffers, one may write a ".proto" description of data structure that is desired to be stored. From that, the protocol buffer compiling module 410 may create a class that implements automatic encoding and parsing of the protocol buffer data with an efficient binary format.

According to exemplary embodiments, the validation framework (e.g., DQ rules according to the instant disclosure) may be leveraged at multiple points within a pub-sub environment of the instant disclosure as illustrated in FIG. 3. For example, the validation framework may be used by message producers (e.g., publisher applications to validate their messages before they publish them on a message bus or a server. The validation framework may be used to embed within a publishing framework to enforce the data quality of published messages. The validation framework may be used by message consumers (e.g., subscriber applications) to validate messages before they fully accept/download the messages. The validation framework may be used by a data DQ monitor that subscribes to all messages on the bus, validates the messages and publishes DQ reports (e.g., see FIG. 6).

FIG. 5 illustrates a block diagram of a publishing application in accordance with an exemplary embodiment. More specifically, FIG. 5 illustrates a block diagram to show how the DQ framework may be integrated into publishing applications to prevent messages that fail the DQ tests from being published to a bus/server. As illustrated in FIG. 5, the publishing application 501 may include a publisher 511, a protocol buffer library (.jar) 503 (hereinafter "proto library 503"), a validation framework (.jar) 507 (hereinafter "validation framework library 507"), and a bus connectivity library (.jar) 509 (hereinafter "bus connectivity library 509).

The validation constraints (e.g., data quality rules) modeled by the DQ modeling module 304 may include a severity tag, which may range from Level 1 (highest severity) to Level 4 (lowest severity). An important reason to include a severity is that it may allow a message bus (e.g., bus 516) to define a minimum DQ level that may be published onto it. For example, if the bus's 516 minimum DQ level is set to Level 1, the DQ framework embedded within the publisher 511 will reject messages that fail Level 1 DQ rules, and successfully publish messages that pass all Level 1 rules but fail Level 2 rules etc. The lower level DQ rules may be tested by a post-publish validator (e.g., data quality monitor 611 as illustrated in FIG. 6) and reported on for applications to remediate and improve their quality over time which will be described in more detail below by referring to FIG. 6.

A publishing application 501, as illustrated in FIG. 5 may include, for example, four parts: the publisher's 511 own application code; the proto library 503, the validation framework library 507, and the bus connectivity library 509.

According to exemplary embodiments, the publisher 511 may use the bus connectivity library 509 to connect to the bus 516 via path A as illustrated in FIG. 5. The bus 516 may be a message bus on which a message may be published by a publisher 511 or may be transmitted to a server over the message bus 516. This may be the only way that an application is allowed to connect to the message bus 516 and other attempted connections may be rejected by the bus 516 automatically. When the publisher 511 makes initial connection attempt via the bus connectivity library 509, the publisher 511 queries the bus 516 to get the minimum validation level that all messages must meet for this bus 516. In this example, the bus is configured for L1.

As illustrated in FIG. 5, the publisher 511 may utilize the supplied proto library 503 to build a message containing its business data via B. The publisher 511 may call a publish method of bus connectivity library 509 with the built message via C. The bus connectivity library 509 may call the validation framework with the message and the DQ level specified by the bus 516 via path and the validation framework may execute all rules at the same DQ level and higher levels via D1 and D2. More specifically, if all rules are successful, a pass state may be returned to the bus connectivity library 509 via D1 and if any of the rules fail, the reason for the failure may be returned to the bus connectivity library 509 via D2, including the original NRL that was used to model the rule. When the validation framework encounters a message type for the first time, it may read, via E, the rule configuration from the proto library 503 and may compile it into a rule configuration object, which it may cache for validating further messages of the same type.

The bus connectivity library 509 may receive the validation result from the validation framework and acts accordingly at F1, F2, and F3 as illustrated in FIG. 5. For example, if the message passed validation, it may be published onto the bus 516 via F1. If the message failed validation, a checked exception may be returned to the publisher 511 via F2. The exception may contain a reason for the failure including the NRL that was used to model the rule. The bus library may also publish a DQ exception message to the bus 516 containing the details of the exception via F3. This may be useful in a pub-sub environment of the instant disclosure to help monitor the overall health of the pub-sub environment. For example, the published DQ exception message may be utilized to monitor which publisher application is failing to publish and may understand why particular business events are being held up within a flow in the pub-sub environment.

According to exemplary embodiments, it should be understood by an ordinary skill in the art that reference numerals A, B, C, D1, D2, F1, F2, and F3 represent corresponding interconnectivity of each elements within the publishing application 501.

FIG. 6 illustrates a block diagram of a data quality monitoring application across a pub-sub environment in accordance with an exemplary embodiment. For example, FIG. 6 illustrates a block diagram of how a data quality monitoring application 601 utilizes the validation framework or DQ rules to monitor data quality across the pub-sub environment.

As illustrated in FIG. 6, the data quality monitoring application 601 may include a data quality monitor 611 (hereinafter "DQ monitor 611"), a protocol buffer library (.jar) 603 (hereinafter "proto library 603"), a validation framework (.jar) 607 (hereinafter "validation framework library 607"), a bus connectivity library (.jar) 609 (hereinafter "bus connectivity library 609").

According to exemplary embodiments, the same DQ framework that is embedded in publishing applications as illustrated in FIG. 5 may be embedded into the DQ monitoring application 601 that may validate all messages published by all publisher applications belonging to corresponding systems. This approach, as illustrated in FIG. 6, may be utilized to identify lower severity issues in production that should be fixed to improve the data quality of the entire pub-sub environment.

The data quality monitoring application 601, as illustrated in FIG. 6 may include, for example, four parts: the data quality monitor's 611 own application code; the proto library 603, the validation framework library 607, and the bus connectivity library 609.

According to exemplary embodiments, the DQ monitor 611 may, via A', configure a subscription with the bus connectivity library 609, register a listener that may receive messages and then start the subscription. The bus connectivity library 609 may, via B', connect and starts a subscription on the bus 616. According to exemplary embodiments, the bus 616 may be a messaging bus. The bus 616 may, via C', send all relevant messages to the bus connectivity library 609. The bus connectivity library 609 may, via D', call the registered listener with each message received. The DQ monitor 611 may, via E', pass the message to the validation framework library 607 and may use the lowest severity level, which may mean, according to exemplary embodiment, that all rules from L1 to L4 should be executed. The validation framework library 607 may also be configured by the data quality monitoring application to not "fail fast," but instead to run every rule and collect all exceptions. The validation framework library 607 may return a single state indicating whether all rules passed or any rules that failed validation.

According to exemplary embodiments, when the validation framework library 607 encounters a message type for the first time, it may, via F', read the rule configuration from the proto library 603 and may, via F', compile it into a rule configuration object, which it may cache for validating further messages of the same type. If any of the rules on a message failed validation, the DQ monitor 611 may, via G', collect all of the exceptions from the validation framework library 607. The DQ monitor 611 may, via H', aggregate all exceptions across a number of criteria, such as publishing system, message type, etc. The aggregated results may be published to a reporting service 613.

According to exemplary embodiments, it should be understood by an ordinary skill in the art that reference numerals A', B', C', D', H', E', G', and F' represent corresponding interconnectivity of each elements within the data quality monitoring application 601.

According to exemplary embodiments, the DQ framework or DQ rules implemented by the exemplary embodiments as disclosed above may be utilized to validate messages within a subscribing application. For example, any subscribing application may use the validation framework in the same way as the DQ monitoring application 601 as disclosed above with reference to FIG. 6. A subscriber application may use the framework to detect failures that are not rejected by the library at publish time. For example, if the bus 616 is configured to reject L1 failures, an application could receive L2 failures. Thus, the subscriber application may choose to reject L2 failures itself or accept the messages, but put them into a separate queue to be reviewed by a human operator before processing them.

According to exemplary embodiments, the DQ framework or DQ rules implemented by the exemplary embodiments as disclosed above may be utilized to perform additional validation within a publishing application. For example, a publishing application may call the validation framework library 607 directly, just the same way that a subscribing application can. This approach may provide development teams the capability to test their own messages during development and testing. This is particularly beneficial when integrated within a Continual Integration test suite, as it may alert a team to changes that they make that would likely fail validation, as well as alerting the team to new rules that might fail when they update to a newer version of the proto library 603 that includes additional rules.

Figure 7:
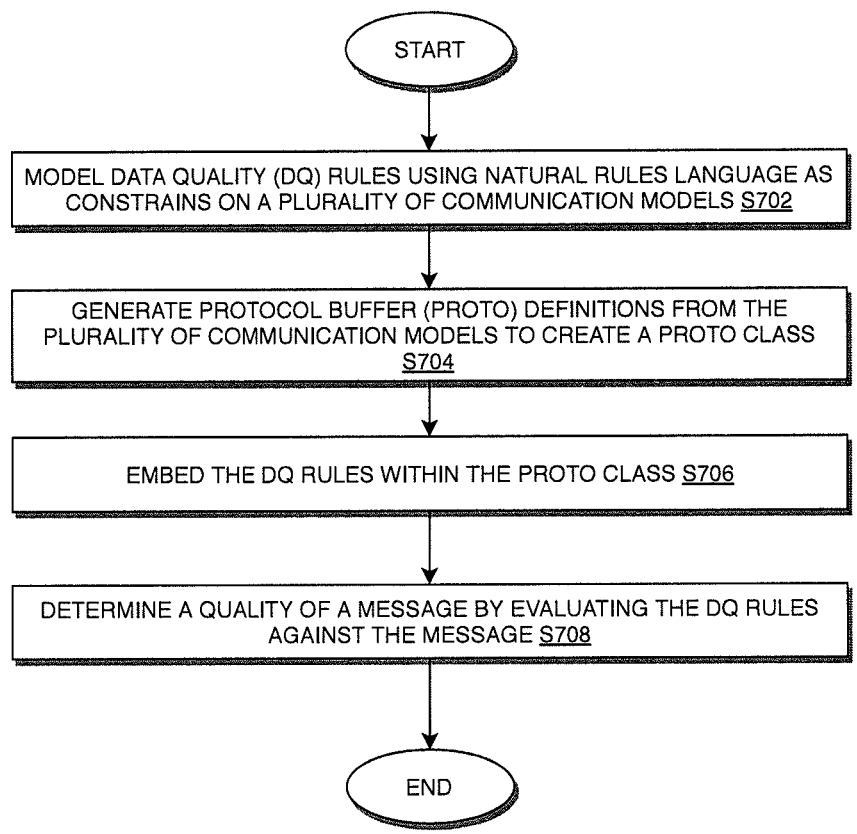
FIG. 7 illustrates a flow chart for implementing a data quality framework module in accordance with an exemplary embodiment.

FIG. 7 illustrates a flow chart for implementing a data quality framework module in accordance with an exemplary embodiment.

In the process of FIG. 7, at step S702, a DQ modeling module may model data quality rules (data quality framework) using natural rules language (NRL) as constraints on a plurality of communication models.

At step S704, a protocol buffer definitions generation module may generate protocol buffer definitions from the plurality of communication models to create a protocol buffer class. The protocol buffer class may be utilized to create a message by a publication application. The message may be transmitted over a publish-subscribe messaging bus to a server.

At step S706, an embedding module may embed the data quality rules within the protocol buffer class in accordance with process disclosed above with the exemplary embodiments.

At step S708, a quality of the message may be determined by evaluating the data quality rules against the message.

The step S708 may further include: setting a predetermined threshold level of data quality required by the server for publishing the message to be transmitted over the publish-subscribe messaging bus to the server; and rejecting publication of the message, when in the determining step S708, it is determined that the quality of the message is below the predetermined threshold level.

The step S708 may further include: setting a predetermined threshold level of data quality required by the server for publishing the message to be transmitted over the publish-subscribe messaging bus to the server; and accepting publication of the message, when in the determining step S708, it is determined that the quality of the message is at or above the predetermined threshold level.

The plurality of communication models, according to exemplary embodiments, may include one or more unified modeling language (UML) models and the generating step S704 may further include generating the protocol buffer definitions from the UML models based on the data quality rules.

According to exemplary embodiments, the protocol buffer definitions may be generated at step S704 by the protocol buffer definitions generation module from the communication models using generation framework (e.g., DQ rules/DQ framework) in accordance with exemplary embodiments as illustrated FIGS. 4 and 5. The same generation framework may also parse the NRL and constructs a JavaScript object notation (JSON) representation of the DQ rules. After the protocol buffer java source has been generated from the protocol buffer definitions, the DQ JSON may be added to the protocol buffer classes as Java annotations.

According to exemplary embodiments, the embedding step S706 may further include embedding the JSON representation of the data quality rules to the protocol buffer class as Java annotations.

According to exemplary embodiments, the step S708 may further include: setting a predetermined threshold level of data quality required by the server for accepting a published message published by a publisher application and to be accepted by a subscriber application; and rejecting acceptance of the published message by the subscriber application, when in the determining step S708, it is determined that the quality of the message is below the predetermined threshold level.

According to exemplary embodiments, the step S708 may further include: setting a predetermined threshold level of data quality required by the server for accepting a published message published by a publisher application and to be accepted by a subscriber application; and allowing acceptance of the published message by the subscriber application, when in the determining step S708, it is determined that the quality of the message is at or above the predetermined threshold level.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a data quality framework module, the method comprising: modeling, by a processor, data quality rules using a natural rule language (NRL) as constraints on a plurality of communication models; generating, by the processor, protocol buffer definitions from the plurality of communication models to create a protocol buffer class, wherein the protocol buffer class is utilized to create a message by a publication application, the message to be transmitted over a publish-subscribe messaging bus to a server; embedding, by the processor, the data quality rules within the protocol buffer class; determining, by the processor, a quality of the message by evaluating the data quality rules against the message; rejecting or accepting publication of the message based on analyzing the quality of the message with a predetermined threshold level of data quality required by the server for publishing the message; wherein the data quality rules include a severity tag, which ranges from Level 1 (highest severity) to Level 4 (lowest severity) to allow the publish-subscribe messaging bus to define a minimum data quality level that can be published onto it, and wherein the plurality of communication models include one or more unified modeling language (UML) models and the method further comprises: generating, by the processor, the protocol buffer definitions from the UML models based on the data quality rules; and implementing, by the processor, a validation framework that parses an object notification file and produces a validation configuration object to validate the content of the message, wherein the validation configuration object is cached by the validation framework so that subsequent validations of same class do not need to re-parse the object notification file.

2. The method according to claim 1, further comprising: setting, by the processor, the predetermined threshold level of data quality required by the server for publishing the message to be transmitted over the publish-subscribe messaging bus to the server; and rejecting, by the processor, publication of the message, when in the determining, it is determined by the processor that the quality of the message is below the predetermined threshold level.

3. The method according to claim 1, further comprising: setting, by the processor, the predetermined threshold level of data quality required by the server for publishing the message to be transmitted over the publish-subscribe messaging bus to the server; and accepting, by the processor, publication of the message, when in the determining, it is determined by the processor that the quality of the message is at or above the predetermined threshold level.

4. The method according to claim 1, further comprising: parsing, by the processor, the NRL; and creating, by the processor, a JavaScript Object Notation (JSON) representation of the data quality rules.

5. The method according to claim 4, further comprising: embedding, by the processor, the JSON representation of the data quality rules to the protocol buffer class as Java annotations.

6. The method according to claim 1, further comprising: setting, by the processor, the predetermined threshold level of data quality required by the server for accepting a published message published by a publisher application and to be accepted by a subscriber application; and rejecting, by the processor, acceptance of the published message by the subscriber application, when in the determining, it is determined by the processor that the quality of the message is below the predetermined threshold level.

7. The method according to claim 1, further comprising: setting, by the processor, the predetermined threshold level of data quality required by the server for accepting a published message published by a publisher application and to be accepted by a subscriber application; and allowing, by the processor, acceptance of the published message by the subscriber application, when in the determining, it is determined by the processor that the quality of the message is at or above the predetermined threshold level.

8. A system for implementing a data quality framework module, comprising: a processor; and a server, wherein the processor is configured to: model data quality rules using a natural rule language (NRL) as constraints on a plurality of communication models; generate protocol buffer definitions from the plurality of communication models to create a protocol buffer class, wherein the protocol buffer class is utilized to create a message by a publication application, the message to be transmitted over a publish-subscribe messaging bus to the server; embed the data quality rules within the protocol buffer class; determine a quality of the message by evaluating the data quality rules against the message; and reject or accept publication of the message based on analyzing the quality of the message with a predetermined threshold level of data quality required by the server for publishing the message; wherein the data quality rules include a severity tag, which ranges from Level 1 (highest severity) to Level 4 (lowest severity) to allow the publish-subscribe messaging bus to define a minimum data quality level that can be published onto it, and wherein the plurality of communication models include one or more unified modeling language (UML) models and the processor is configured to generate the protocol buffer definitions from the UML models based on the data quality rules; and implement a validation framework that parses an object notification file and produces a validation configuration object to validate the content of the message, wherein the validation configuration object is cached by the validation framework so that subsequent validations of same class do not need to re-parse the object notification file.

9. The system according to claim 8, wherein the processor is further configured to: set the predetermined threshold level of data quality required by the server for publishing the message to be transmitted over the publish-subscribe messaging bus to the server, and reject publication of the message based on a determination that the quality of the message is below the predetermined threshold level.

10. The system according to claim 8, wherein the processor is further configured to: set the predetermined threshold level of data quality required by the server for publishing the message to be transmitted over the publish-subscribe messaging bus to the server; and accept publication of the message based on a determination that the quality of the message is at or above the predetermined threshold level.

11. The system according to claim 8, wherein the processor is further configured to: parse the NRL; and create a JavaScript Object Notation (JSON) representation of the data quality rules.

12. The system according to claim 11, wherein the processor is further configured to embed the JSON representation of the data quality rules to the protocol buffer class as Java annotations.

13. The system according to claim 8, wherein the processor is further configured to: set the predetermined threshold level of data quality required by the server for accepting a published message published by a publisher application and to be accepted by a subscriber application; and reject acceptance of the published message by the subscriber application based on a determination that the quality of the message is below the predetermined threshold level.

14. The system according to claim 8, wherein the processor is further configured to: set the predetermined threshold level of data quality required by the server for accepting a published message published by a publisher application and to be accepted by a subscriber application; and allow acceptance of the published message by the subscriber application based on a determination that the quality of the message is at or above the predetermined threshold level.

15. A non-transitory computer readable medium configured to store instructions for implementing a data quality framework module, wherein when executed, the instructions cause a processor to perform the following: modeling data quality rules using a natural rule language (NRL) as constraints on a plurality of communication models; generating protocol buffer definitions from the plurality of communication models to create a protocol buffer class, wherein the protocol buffer class is utilized to create a message by a publication application, the message to be transmitted over a publish-subscribe messaging bus to a server; embedding the data quality rules within the protocol buffer class; determining a quality of the message by evaluating the data quality rules against the message; and rejecting or accepting publication of the message based on analyzing the quality of the message with a predetermined threshold level of data quality required by the server for publishing the message; wherein the data quality rules include a severity tag, which ranges from Level 1 (highest severity) to Level 4 (lowest severity) to allow the publish-subscribe messaging bus to define a minimum data quality level that can be published onto it, and wherein the plurality of communication models include one or more unified modeling language (UML) models and the instructions, when executed, further cause the processor to perform the following: generating the protocol buffer definitions from the UML models based on the data quality rules; and implementing a validation framework that parses an object notification file and produces a validation configuration object to validate the content of the message, wherein the validation configuration object is cached by the validation framework so that subsequent validations of same class do not need to re-parse the object notification file.

16. The non-transitory computer readable medium of claim 15, wherein the instructions, when executed, further cause the processor to perform the following: setting the predetermined threshold level of data quality required by the server for publishing the message to be transmitted over the publish-subscribe messaging bus to the server; and rejecting publication of the message based on a determination that the quality of the message is below the predetermined threshold level.

17. The non-transitory computer readable medium of claim 15, wherein the instructions, when executed, further cause the processor to perform the following: setting the predetermined threshold level of data quality required by the server for publishing the message to be transmitted over the publish-subscribe messaging bus to the server; and accepting publication of the message based on a determination that the quality of the message is at or above the predetermined threshold level.

\* \* \* \* \*